(12) United States Patent
Kritzler

(10) Patent No.: US 8,853,565 B2
(45) Date of Patent: Oct. 7, 2014

(54) LUGGAGE WITH AN INTEGRATED WEIGHT SCALE AND A WEIGHT SCALE CONFIGURED TO BE FLUSH WITH A SURFACE OF THE LUGGAGE

(75) Inventor: Ronald Kritzler, Miami, FL (US)

(73) Assignee: E-Famtrips, Inc., Miami, FL (US)

( * ) Notice: Subject to any disclaimer, the term of this patent is extended or adjusted under 35 U.S.C. 154(b) by 373 days.

(21) Appl. No.: 13/212,754

(22) Filed: Aug. 18, 2011

(65) Prior Publication Data

US 2013/0043080 A1    Feb. 21, 2013

(51) Int. Cl.
G01G 19/52    (2006.01)
A45C 13/28    (2006.01)
A45C 13/00    (2006.01)
G01G 19/58    (2006.01)

(52) U.S. Cl.
CPC ............... *G01G 19/58* (2013.01); *A45C 13/28* (2013.01)
USPC ........... 177/126; 190/115; 190/116; 177/131; 177/245

(58) Field of Classification Search
USPC ................. 177/126, 127, 131, 148, 149, 245; 190/115, 116
See application file for complete search history.

(56) References Cited

U.S. PATENT DOCUMENTS

| | | | | |
|---|---|---|---|---|
| 2,518,973 A * | 8/1950 | Atherton | | 190/102 |
| 2,710,083 A * | 6/1955 | White | | 190/102 |
| 2,759,577 A * | 8/1956 | White | | 190/102 |
| 2,937,016 A * | 5/1960 | Westman | | 177/156 |
| 3,090,454 A * | 5/1963 | Farrar et al. | | 177/131 |
| 3,213,981 A * | 10/1965 | Axtell | | 16/405 |
| 3,572,870 A * | 3/1971 | Marks et al. | | 312/244 |
| 5,530,990 A * | 7/1996 | Chen | | 16/113.1 |
| 6,608,261 B2 * | 8/2003 | Thadani | | 177/126 |
| 7,232,961 B1 * | 6/2007 | Godshaw et al. | | 177/131 |
| 7,378,604 B2 * | 5/2008 | Truong | | 177/131 |
| D575,178 S * | 8/2008 | Thybulle | | D10/89 |
| D575,179 S * | 8/2008 | Thybulle | | D10/89 |
| 7,501,591 B1 * | 3/2009 | Muniz et al. | | 177/131 |
| 7,550,684 B2 | 6/2009 | Kritzler | | |
| 7,732,719 B1 * | 6/2010 | Schantz | | 177/126 |
| 8,344,271 B1 * | 1/2013 | Falk, Jr. | | 177/126 |
| 8,485,329 B1 * | 7/2013 | Roy et al. | | 190/116 |
| 2006/0196708 A1 * | 9/2006 | Keech et al. | | 177/245 |
| 2006/0207850 A1 | 9/2006 | Lewis | | |
| 2006/0231297 A1 | 10/2006 | Patel | | |
| 2007/0007048 A1 * | 1/2007 | Gill | | 177/131 |

(Continued)

FOREIGN PATENT DOCUMENTS

| | | | | |
|---|---|---|---|---|
| GB | 2467318 | * | 1/2009 | G01G 19/58 |
| JP | 2002-253319 | * | 9/2002 | A45C 3/02 |

*Primary Examiner* — Randy W Gibson
(74) *Attorney, Agent, or Firm* — Laurence A. Greenberg; Werner H. Stemer; Ralph E. Locher

(57) ABSTRACT

A piece of luggage has a body with a surface. A weight scale has a top surface and is disposed in the body of the luggage. The top surface of the weight scale is coplanar with the surface of the body of the luggage. The weight scale determines a weight of the piece of luggage when in an operating state. When the weight scale is in a non-operating state it is stored safely within the body of the luggage. Most importantly the weight scale does not stick out from the body of the luggage so as to be susceptible to damage during transport of the luggage.

22 Claims, 2 Drawing Sheets

(56) References Cited

U.S. PATENT DOCUMENTS

| | | | |
|---|---|---|---|
| 2007/0163813 A1* | 7/2007 | Lewis | 177/148 |
| 2007/0205025 A1 | 9/2007 | Taha | |
| 2008/0006449 A1* | 1/2008 | Lewis | 177/126 |
| 2008/0035391 A1 | 2/2008 | Jewett et al. | |
| 2009/0057037 A1* | 3/2009 | Muniz et al. | 177/131 |
| 2010/0116559 A1 | 5/2010 | Moon | |
| 2011/0100726 A1* | 5/2011 | Wu et al. | 177/132 |
| 2012/0006600 A1* | 1/2012 | Bieber et al. | 177/127 |
| 2012/0186926 A1* | 7/2012 | Sheikh | 190/115 |
| 2012/0222904 A1* | 9/2012 | Lu | 177/148 |

* cited by examiner

LUGGAGE WITH AN INTEGRATED WEIGHT SCALE AND A WEIGHT SCALE CONFIGURED TO BE FLUSH WITH A SURFACE OF THE LUGGAGE

BACKGROUND OF THE INVENTION

Field of the Invention

The invention relates to a piece of luggage having an integrated weight scale allowing convenient weighing of the piece luggage.

Luggage weight measuring devices that are either integrated into the luggage, the luggage handle or attached to the luggage handle are known in the art. It is known to use mechanical, typically spring loaded mechanisms, integrated into the luggage handle or the luggage itself at the point of connection with the handle.

U.S. patent publication No. 2007/0007048 by Gill discloses such a luggage weight measuring device. In Gill, the weight measuring device is integrated into the handle as part of the luggage. While this disclosure may solve the problem of storage of the weight measuring device, the weight measuring device is integrated in the handle and is subject to high levels of wear and tear due to its positioning in the handle and therefore has a high rate of failure as the luggage ages.

U.S. patent publication 2007/0205025 to Taha solves the problem of the Gill publication by removing the scale device from the handle and placing it on the body of the luggage, so that the luggage and scale are integrated. The scale is place on the bottom of the luggage or the side of the luggage and transmits its readings to a display located at the top of the luggage. However, at all times the scale load cells and the display screen are exposed on the exterior bottom or on the exterior sides and top of the luggage and are easily damaged by the handlers as the scale extends out from the exterior walls of the luggage.

U.S. patent publication No. 2010/0116559 by Moon teaches a removable luggage scale device which can be attached to the luggage to perform a weight measurement and then removed once the measurement is complete. Although, the removal of the scale prevents the scale from being damaged while the luggage is in use, the scale is not integrated into the luggage and therefore can be forgotten or misplaced.

There is a need for a luggage scale that is simple to integrate into the luggage but is safe from wear and tear, does not extend out from the exterior of the luggage where it can be damaged, and all of its elements are protected while it is not being utilized. Furthermore the scale can be serviced or replaced by luggage repair stores.

BRIEF SUMMARY OF THE INVENTION

It is accordingly an object of the invention to provide a luggage scale module that can be integrated into any luggage frame that overcomes the above-mentioned disadvantages of the heretofore-known devices of this general type, which is protected by being fully integrated in a piece of luggage.

With the foregoing and other objects in view there is provided, in accordance with the invention a piece of luggage. The piece of luggage has a body with a surface. A weight scale has a top surface and is disposed in the body of the luggage. The top surface of the weight scale is coplanar with the surface of the luggage body. The weight scale determines the weight of the piece of luggage. Because the surfaces of the weight scale and the body of the luggage are coplanar, the weight scale is integrated in the luggage without sticking out from the surface of the luggage and is therefore less susceptible to damage.

In accordance with an added feature of the invention, the weight scale has a base body member and a handle detachably attached to the base body member. The base body member further has a base recess formed therein and the handle is disposed in the base recess in a non-operating state.

In accordance with a further feature of the invention, the base body member has a flange with a top flange surface and the handle has a top handle surface. The luggage body has a recess and the base body is member disposed in the recess and the top flange surface and the handle surface are coplanar with the surface of the luggage body.

In accordance with an additional feature of the invention, the handle has two hand grips disposed on opposite sides of the handle to assist in gripping the handle. The flange has two indentations which are each disposed opposite one of the hand grips, the indentations allow easier access by a hand of a user to grip the hand grips.

In accordance with another additional feature of the invention, the handle has a top side and a bottom side. Because the bottom side is formed of a soft or flexible material, it functions as a seal when the handle is stored in the base recess of the base body member. Ideally the soft or flexible material is rubber or a flexible plastic.

In accordance with another further feature of the invention, the hand grips have raised surfaces for assisting in gripping the hand grips.

In accordance with yet another feature of the invention, the weight scale has a display and operating buttons for controlling the functioning of the weight scale.

In accordance with another additional feature of the invention, a chain connects the base body member to the handle. In this manner the handle can be taken out of the base body member and raised. As the handle is raised, the chain transfers to the weight sensor the weight of the luggage so that the weight sensor can ascertain a reading of the luggage's weight and the actual weight can be read from the display.

In accordance with a concomitant feature of the invention, the handle has friction tabs which rub against the base body member when the handle is installed in the base recess. The friction tabs are provided for assisting in securing the handle to the base body member.

With the foregoing and other objects in view there is provided, in accordance with the invention a weight scale. The weight scale includes a base body member having an interior, a handle covering part of the base body member and detachably attached to the base body member, and a display supported in the interior of the base body member and protected from damage by the handle. The display is only exposed to the environment when the handle is removed.

Other features that are considered as characteristic for the invention are set forth in the appended claims.

Although the invention is described herein as embodied in a piece of luggage having an integrated weight scale and a weight scale, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE INVENTION

Figure 1:
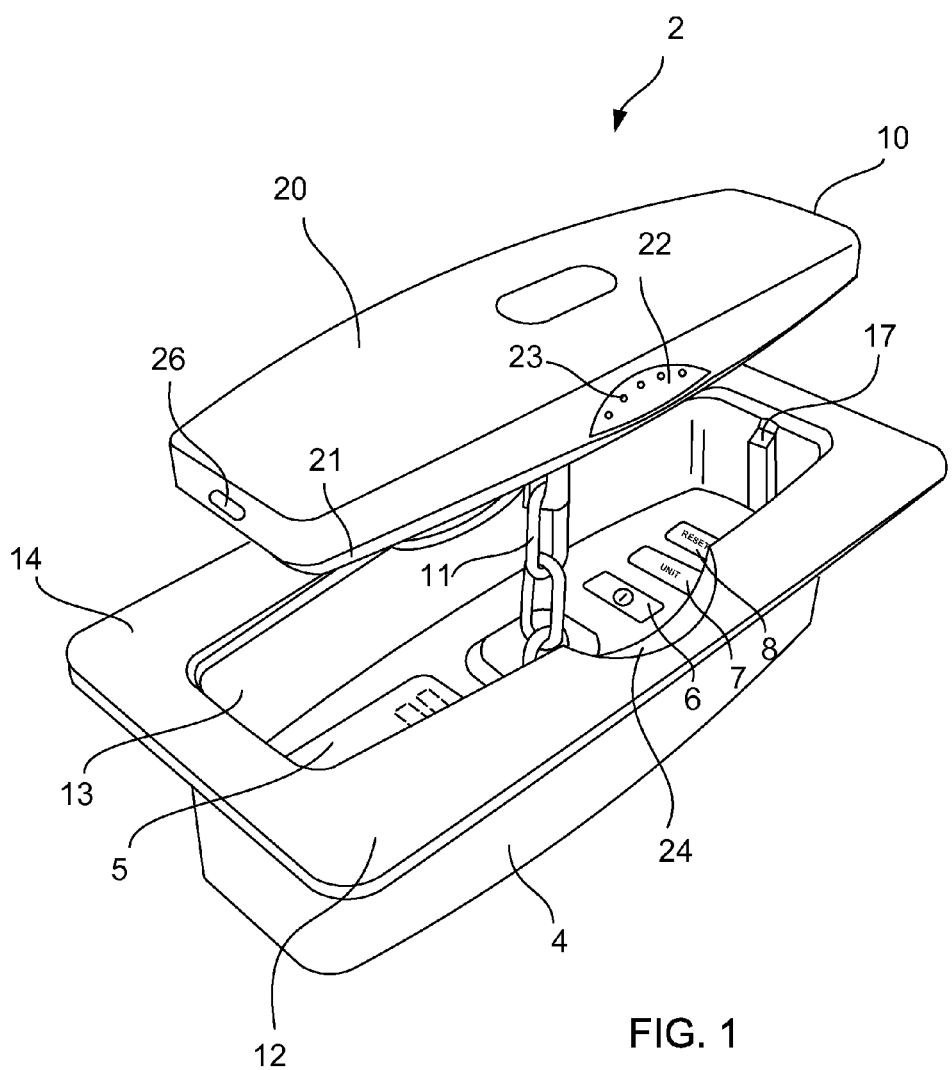
FIG. 1 is a diagrammatic, perspective view of a weight scale according to the invention.
Figure 2:
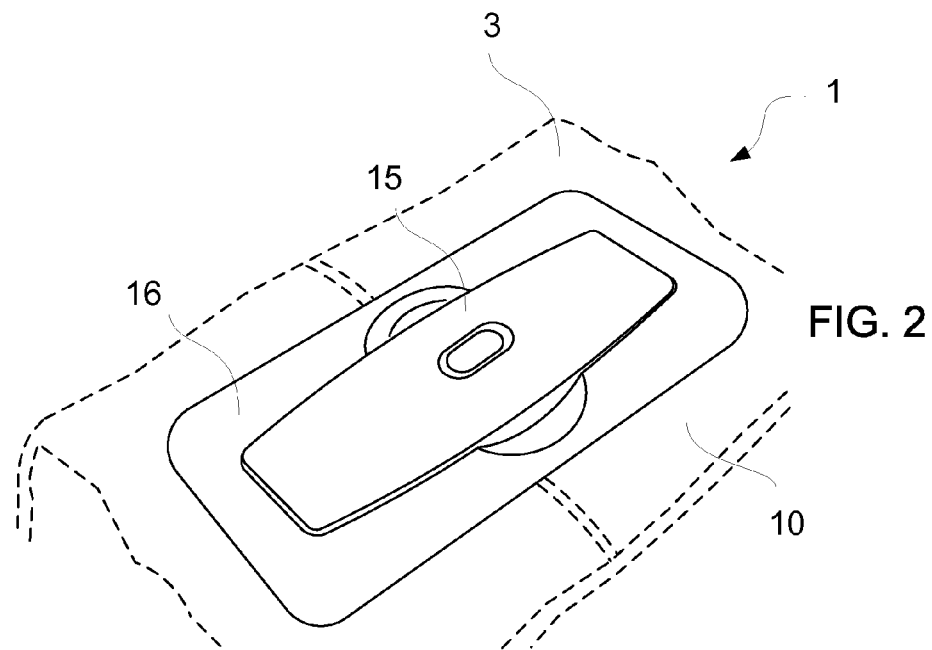
FIG. 2 is a top view of the weight scale integrated into a piece of luggage.

Referring now to the figures of the drawing in detail and first, particularly, to FIGS. 1 and 2 thereof, there is shown a piece of luggage 1 having a weight scale 2 integrated into a body 3 of the luggage 1. Ideally, the weight scale 2 is integrated into the top surface 10 of the luggage 1. However, the weight scale 2 could be integrated into the side or the bottom of the luggage 1.

The weight scale 2 has a base body member 4. The base body member 4 houses the main components of the weight scale 2 including a display 5 and control buttons 6-8. The internal workings of a weight scale 2 are well known in the art and are not repeated here. What is critical to the invention is that the weight scale 2 has a handle 10 which is detachable from the base body member 4. A chain 11 couples the handle 10 to the base body member 4 and thus the internal workings of the weight scale 2.

Figure 3:
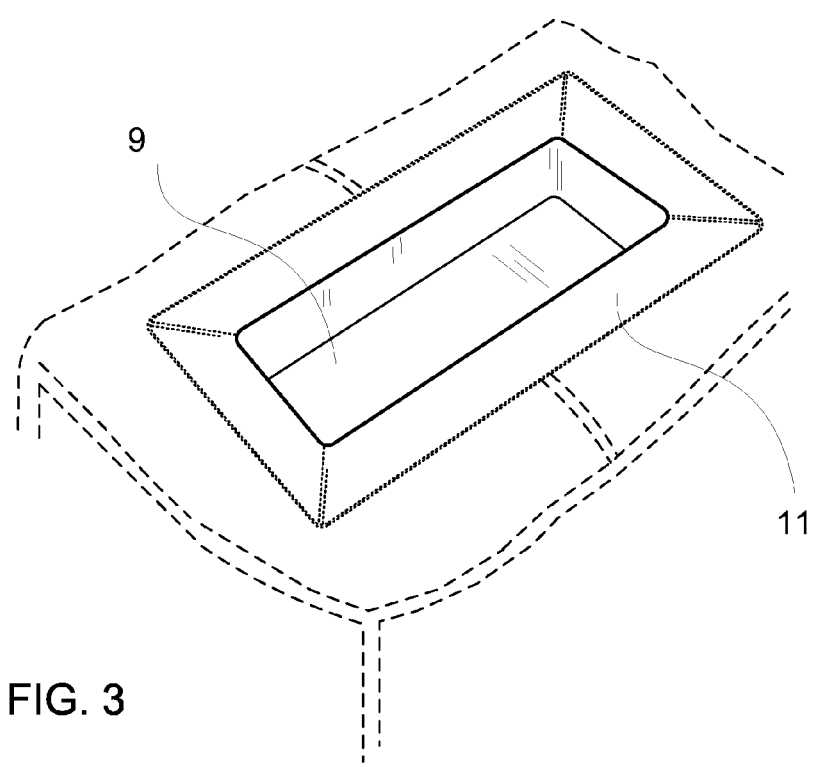
FIG. 3 is a top view of the piece of luggage without the weight scale.

The base body member 4 has a top flange 12 which is flush or coplanar with the body 3 of the luggage 1 so that the top flange 12 and the body 3 make a near continuous surface. More specifically, the top flange 12 fits into a corresponding recess 9 formed in the luggage 1 such that the surfaces of the luggage 1 and the weight scale 2 are coplanar when the weight scale 2 is integrated into the luggage 1 (see FIG. 3). The recess 9 also has indented shoulder areas 11 for receiving wings 14 of the flange 12 so that the surfaces are coplanar. It is further possible that the recess 9 does not have the indented shoulder areas 11 and that the flange 12 rests directly on the surface 10 of the luggage and protrudes 1-3 millimeters above the surface 10 of the luggage 1, ideally less than 2 millimeters and preferably less than 1 millimeter.

The top flange 12 has a main opening 13 which is configured complementary to the shape of the handle 10 such that the handle 10 fits in the main opening 13 in a form fitting manner. A top surface 15 of the handle 10 is continuous (coplanar) with a top surface 16 of the top flange 12. The base body member 4 has ribs 17 which limit the distance that the handle 10 may extend into the recess 13. The handle 10 has a top portion 20 and a bottom portion 21. The bottom portion 21 can be formed of a soft material such as rubber or a flexible plastic that extends around the whole perimeter of the handle 10 so that the handle 10 makes a snug fit when placed in the base body member 4. The bottom portion 21 therefore functions as a seal. The handle 10 further has hand grips 22 with raised portions 23 for assisting in gripping the handle 10. Ideally the hand grips 22 are also made from a soft material such as rubber or a flexible plastic.

The top flange 12 has two indentations 24 that allow easy access to the hand grips 22 which are disposed opposite the indentations 24. In this manner, a user's hand can have easier access to the handle 10 and pull the handle 10 out from the base body member 4. Ideally, the indentations 24 are semi-circular shaped.

The handle 10 further has friction tabs 26 for making a friction engagement with the base body member 4 when the handle 10 is placed into the base body member 4. The friction tabs 26 assist in holding the handle 10 to the base body member 4.

As noted in the figures, when not in use the weight scale 2 is safely integrated into the luggage 1 and therefore is less likely to be damaged when the luggage 1 is in use because components of the weight scale 2 do not extend out or minimally extend out from the luggage 1. In addition, the top flange 12 and the top portion 20 of the handle 10 are made from a hard plastic or metal so that the weight scale 2 is of a robust design.

When the user is ready to weigh his or her luggage 1, the hand of the user slides into the indentations 24 and engages the hand grip 22. By pulling on the hand grip 22, the handle 10 is released from the base body member 4 when the seal and friction tab 26 induced friction is overcome. When the handle 10 is lifted the user has access to the operating buttons 6-8 and can turn on the weight scale 2. After the weight scale 2 is turned on, the user lifts the handle 10 further so that the chain 11 stresses under the pressure of the lifted luggage 1 and a reading can be obtained on the actual weight of the luggage 1. After the weight has been read from the display 5, the weight scale 2 is turned off by actuation of the operating buttons 6-8 and the handle 10 is returned to its seated position in the base body member 4.

Because the weight scale 2 is integrated into the body of the luggage 1, the weight scale does not stick out as in the case of the prior art devices and therefore is less susceptible to damage.

The operating buttons 6-8 and the display 5 of the weight scale 2 are buried deep within the body of the weight scale 2 and thus are protected from being damaged during transport of the luggage 1 or the weight scale 2. One of the major problems with prior art weight scales is that the operating buttons are exposed to the environment and were easily damage. More specifically it is common for the weight display and the control buttons to be on an external side and therefore were frequently damaged. This problem is solved in the instant application as the display 5 and control buttons 6-8 are protected by the base body member 4 and the handle 10.

The invention claimed is:

1. A piece of luggage, comprising:
a luggage body having a surface;
a luggage handle attached to said luggage body; and
a weight scale having a top surface and disposed in said luggage body, said top surface of said weight scale being coplanar with said surface of said luggage body, said weight scale determining a weight of the piece of luggage, said weight scale having a base body member and a handle received in said base body member and removable from said base body member, said handle of said weight scale is not said luggage handle of the piece of luggage and is used for determining the weight of the piece of luggage, said base body member permanently fixed to said luggage body offset from said luggage handle and not movable between a functional and non-function position.

2. The piece of luggage according to claim 1, wherein said base body member has a base recess formed therein and said handle is disposed in said base recess in a non-operating state.

3. The piece of luggage according to claim 2, wherein:
said base body member has a flange with a top flange surface;
said handle has a top handle surface; and
said luggage body has a recess formed therein, said base body member is disposed in said recess and said top flange surface and said handle surface are coplanar with said surface of said luggage body.

4. The piece of luggage according to claim 3, wherein:
said handle has two hand grips disposed on opposite sides of said handle for assisting in gripping said handle; and
said flange has two indentations formed therein and each disposed opposite one of said hand grips, said indentations allowing easier access by a hand of a user to grip said hand grips.

5. The piece of luggage according to claim 2, wherein said handle has a top side and a bottom side, said bottom side formed of a flexible material and functions as a seal when engaging said base recess.

6. The piece of luggage according to claim 5, wherein said flexible material is selected from the group consisting of rubber and plastics.

7. The piece of luggage according to claim 4, wherein said hand grips have raised surfaces for assisting in gripping said hand grips.

8. The piece of luggage according to claim 1, wherein said weight scale has a display and operating buttons for controlling the functioning of said weight scale.

9. The piece of luggage according to claim 1, further comprising a chain connecting said base body member to said handle.

10. The piece of luggage according to claim 2, wherein said handle has friction tabs which rub against said base body member when said handle is installed in said base recess.

11. A piece of luggage, comprising:
a luggage body having a surface;
a luggage handle attached to said luggage body; and
a weight scale having a top surface and disposed in said luggage body, said top surface of said weight scale extending no more than 3 millimeters above said surface of said luggage body, said weight scale determining a weight of the piece of luggage, said weight scale having a base body member and a handle received in said base body member and removable from said base body member, said handle of said weight scale is not said luggage handle of the piece of luggage and is used for determining the weight of the piece of luggage, said base body member permanently fixed to said luggage body offset from said luggage handle and not movable between a functional and non-function position.

12. The piece of luggage according to claim 11 wherein said top surface of said weight scale extends no more than 2 millimeters above said surface of said luggage body.

13. The piece of luggage according to claim 11 wherein said top surface of said weight scale extends no more than 1 millimeter above said surface of said luggage body.

14. A weight scale, comprising:
a base body member having an interior;
a handle covering part of said base body member and detachably attached to said base body member;
a display supported in said interior of said base body member and protected from damage by said handle, said display only being exposed to an environment when said handle is removed; and
operating buttons for controlling a functioning of the weight scale, said operating buttons disposed in said interior of said base body member and covered by said handle.

15. The weight scale according to claim 14, wherein said base body member has a base recess formed therein and said handle is disposed in said base recess in a non-operating state.

16. The weight scale according to claim 14, wherein:
said handle has a top handle surface; and
said base body member has a flange with a top flange surface, said flange configured for being inserted into a recess of a luggage body such that said top flange surface and said top handle surface are coplanar with a surface of the luggage body.

17. The weight scale according to claim 16, wherein:
said handle has two hand grips disposed on opposite sides of said handle for assisting in gripping said handle; and
said flange has two indentations formed therein and each disposed opposite one of said hand grips, said indentations allowing easier access by a hand of a user to grip said hand grips.

18. The weight scale according to claim 14, wherein said handle has a top side and a bottom side, said bottom side is formed of a flexible material and functions as a seal when engaging said base body member.

19. The weight scale according to claim 18, wherein said flexible material is selected from the group consisting of rubber and plastics.

20. The weight scale according to claim 17, wherein said hand grips have raised surfaces for assisting in gripping said hand grips.

21. The weight scale according to claim 14, further comprising a chain connecting said base body member to said handle.

22. The weight scale according to claim 14, wherein said handle has friction tabs which rub against said base body member when said handle is installed in said base body member.

* * * * *